(12) United States Patent
Kim et al.

(10) Patent No.: US 11,107,635 B2
(45) Date of Patent: Aug. 31, 2021

(54) CAPACITOR COMPONENT

(71) Applicant: SAMSUNG ELECTRO-MECHANICS CO., LTD., Suwon-si (KR)

(72) Inventors: Hwi Dae Kim, Suwon-si (KR); Sang Soo Park, Suwon-si (KR); Young Ghyu Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/535,438

(22) Filed: Aug. 8, 2019

(65) Prior Publication Data
US 2020/0168399 A1    May 28, 2020

(30) Foreign Application Priority Data
Nov. 27, 2018  (KR) .................. 10-2018-0148507

(51) Int. Cl.
*H01G 4/012*    (2006.01)
*H01G 4/30*    (2006.01)
(Continued)

(52) U.S. Cl.
CPC ......... *H01G 4/2325* (2013.01); *H01G 4/0085* (2013.01); *H01G 4/012* (2013.01);
(Continued)

(58) Field of Classification Search
CPC ........ H01G 4/2325; H01G 4/30; H01G 4/012; H01G 4/1227; H01G 4/0085
See application file for complete search history.

(56) References Cited

U.S. PATENT DOCUMENTS 4,771,520 A * 9/1988 Tanaka ................ H01G 4/30
                                                29/25.42
2001/0032737 A1* 10/2001 Taira ................ H01G 4/232
                                                174/257
(Continued)

FOREIGN PATENT DOCUMENTS

JP    S62124836 U  *  8/1987
JP    11040920 A   *  2/1999
(Continued)

*Primary Examiner* — David M Sinclair
(74) *Attorney, Agent, or Firm* — Morgan, Lewis & Bockius LLP (57) ABSTRACT

A capacitor component includes a body including a first surface and a second surface opposing each other in a first direction, a third surface and a fourth surface connected to the first and second surfaces and opposing each other in a second direction, a fifth surface and a sixth surface connected to the first to fourth surfaces and opposing each other in a third direction, and including a first dielectric layer, and a first internal electrode and a second internal electrode disposed to oppose each other in the first direction with the first dielectric layer interposed therebetween, and a first side margin portion and a second side margin portion, respectively including a second dielectric layer, a first margin electrode, and a second margin electrode, disposed in parallel with the fifth and sixth surfaces of the body, and respectively disposed on the fifth and sixth surfaces of the body.

17 Claims, 11 Drawing Sheets
(1 of 11 Drawing Sheet(s) Filed in Color)

(51) Int. Cl.
  *H01G 4/232*  (2006.01)
  *H01G 4/008*  (2006.01)
  *H01G 4/12*   (2006.01)
  *H01G 4/248*  (2006.01)

(52) U.S. Cl.
  CPC ........... *H01G 4/1227* (2013.01); *H01G 4/248* (2013.01); *H01G 4/30* (2013.01)

(56) References Cited

U.S. PATENT DOCUMENTS

| | | | | |
|---|---|---|---|---|
| 2006/0158827 | A1* | 7/2006 | Lee | H01G 4/30 |
| | | | | 361/311 |
| 2010/0039749 | A1 | 2/2010 | Ritter et al. | |
| 2012/0229950 | A1 | 9/2012 | Kim et al. | |
| 2013/0115411 | A1* | 5/2013 | Kimura | B32B 38/0036 |
| | | | | 428/105 |
| 2014/0043723 | A1* | 2/2014 | Hattori | H01G 2/065 |
| | | | | 361/301.4 |
| 2016/0027584 | A1* | 1/2016 | Hattori | H01G 4/224 |
| | | | | 361/301.4 |

FOREIGN PATENT DOCUMENTS

| | | | | |
|---|---|---|---|---|
| JP | 2000-133545 | A | | 5/2000 |
| JP | 2009059888 | A * | 3/2009 | ......... B32B 38/0004 |
| JP | 2010-45372 | A | | 2/2010 |
| JP | 2012029015 | A * | 2/2012 | ......... B32B 38/0004 |
| KR | 10-1141342 | B1 | | 5/2012 |

* cited by examiner

CAPACITOR COMPONENT

CROSS-REFERENCE TO RELATED APPLICATION

This application claims benefit of priority to Korean Patent Application No. 10-2018-0148507 filed on Nov. 27, 2018 in the Korean Intellectual Property Office, the disclosure of which is incorporated herein by reference in its entirety.

BACKGROUND

1. Field

The present disclosure relates to a capacitor component.

2. Description of Related Art

A multilayer ceramic capacitor (MLCC), a capacitor component, may be a chip type capacitor mounted on the printed circuit boards of various electronic products which plays a role in charging or discharging electricity therein or therefrom, for example, an imaging device such as a liquid crystal display (LCD), a plasma display panel (PDP), and the like, a computer, a smartphone, a mobile phone, or the like.

Such a multilayer ceramic capacitor may be used as a component of various electronic devices, due to having a relatively compact size, relatively high capacity, relative ease of mounting, and the like. As electronic devices such as computers and mobile devices become smaller in size and higher in power output, demand for miniaturization and higher capacity in multilayer ceramic capacitors are increasing.

In addition, the multilayer ceramic capacitor may be often used for decoupling purposes, and it is preferable that the impedance is low in a region after the self resonant frequency (SRF) to effectively remove the high frequency noise signal.

In order to lower the impedance in the region after the SRF, it is necessary to propose a method of minimizing the equivalent series inductance (ESL), a parasitic element.

SUMMARY

An aspect of the present disclosure is to provide a capacitor component with reduced equivalent series inductance (ESL).

According to an aspect of the present disclosure, a capacitor component includes a body including a first surface and a second surface opposing each other in a first direction, a third surface and a fourth surface connected to the first and second surfaces and opposing each other in a second direction, a fifth surface and a sixth surface connected to the first to fourth surfaces and opposing each other in a third direction, and including a first dielectric layer, and a first internal electrode and a second internal electrode disposed to oppose each other in the first direction with the first dielectric layer interposed therebetween; a first side margin portion and a second side margin portion, respectively including a second dielectric layer, a first margin electrode, and a second margin electrode, disposed in parallel with the fifth and sixth surfaces of the body, and respectively disposed on the fifth and sixth surfaces of the body; a first external electrode disposed on the third surface of the body and connected to the first internal electrode and the first margin electrode; and a second external electrode disposed on the fourth surface of the body and connected to the second internal electrode and the second margin electrode.

BRIEF DESCRIPTION OF DRAWINGS

The patent or patent application file contains at least one drawing executed in color. Copies of this patent or patent application publication with color drawing(s) will be provided by the Office upon request and payment of the necessary fee.

The above and other aspects, features, and advantages of the present disclosure will be more clearly understood from the following detailed description, taken in conjunction with the accompanying drawings.

DETAILED DESCRIPTION

Hereinafter, embodiments of the present disclosure is be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinarily skilled artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may include other elements as well, without departing from the other elements, unless specifically stated otherwise.

In the drawings, an X direction may be defined as a second direction, an L direction, or a longitudinal direction, a Y direction may be defined as a third direction, a W direction, or a width direction, and a Z direction may be defined as a first direction, a T direction, or a thickness direction.

Capacitor Component

Figure 1:
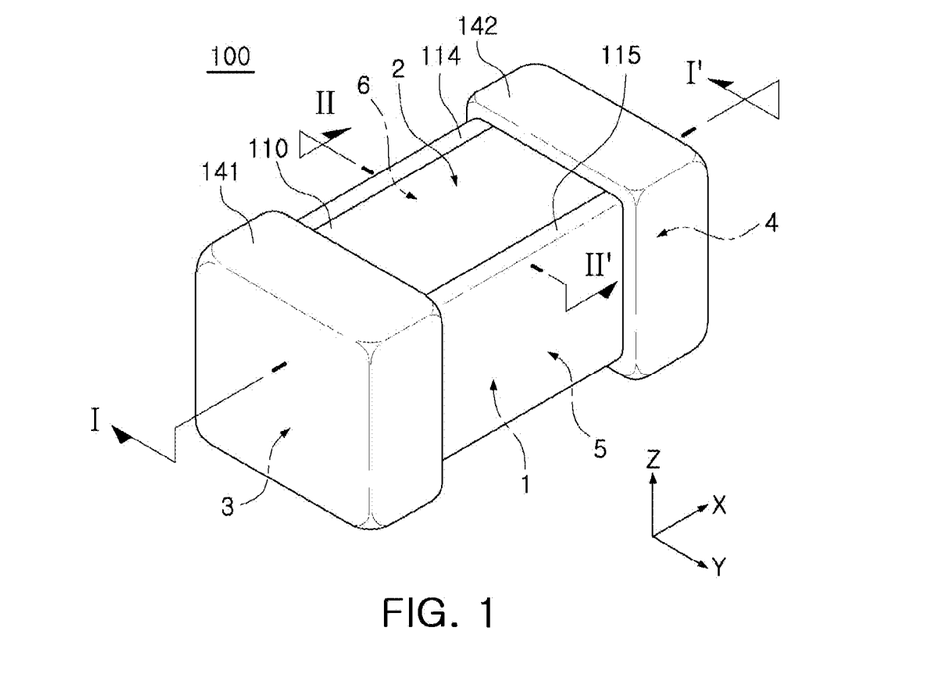
FIG. 1 schematically illustrates a perspective view of a capacitor component according to an embodiment of the present disclosure.

FIG. 1 schematically illustrates a perspective view of a capacitor component according to an embodiment of the present disclosure.

Figure 2:
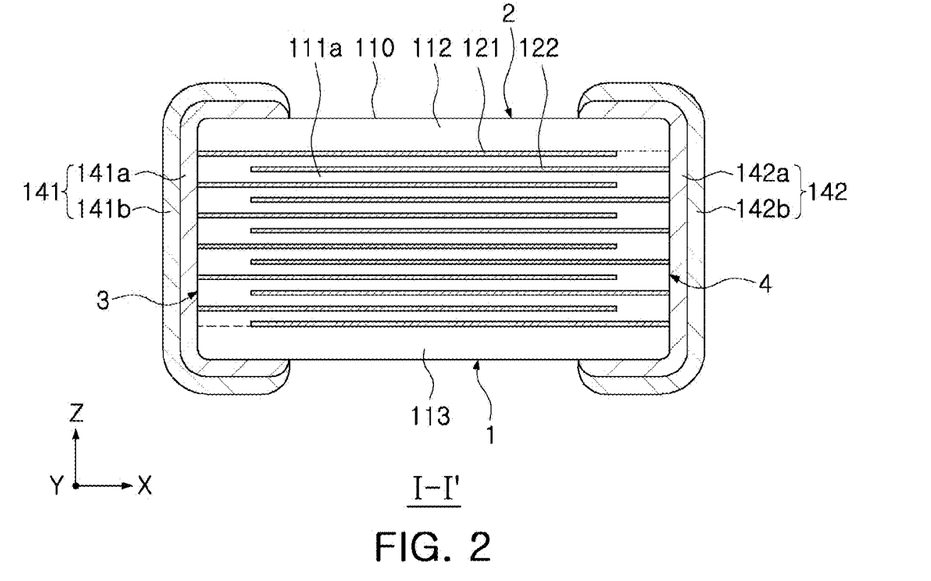
FIG. 2 schematically illustrates a cross-sectional view taken along line I-I' in FIG. 1.

FIG. 2 schematically illustrates a cross-sectional view taken along line I-I' in FIG. 1.

Figure 3:
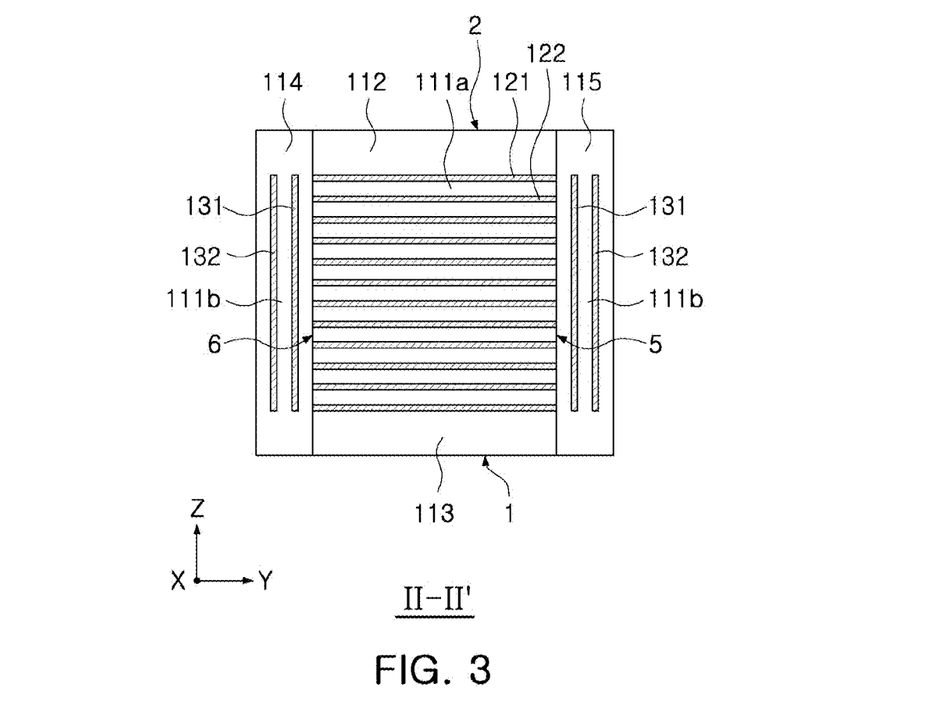
FIG. 3 schematically illustrates a cross-sectional view taken along line II-II' in FIG. 1.

FIG. 3 schematically illustrates a cross-sectional view taken along line II-II' in FIG. 1.

Figure 4A:
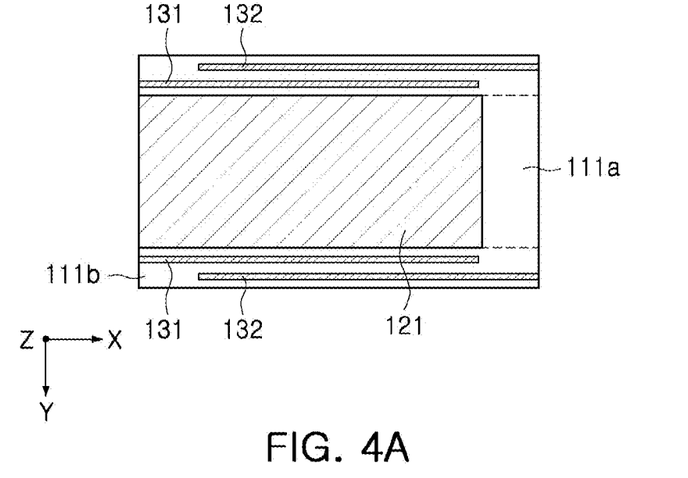
FIG. 4A is a view of a first internal electrode in the X and Y direction cross-sectional views of FIG. 1.
Figure 4B:
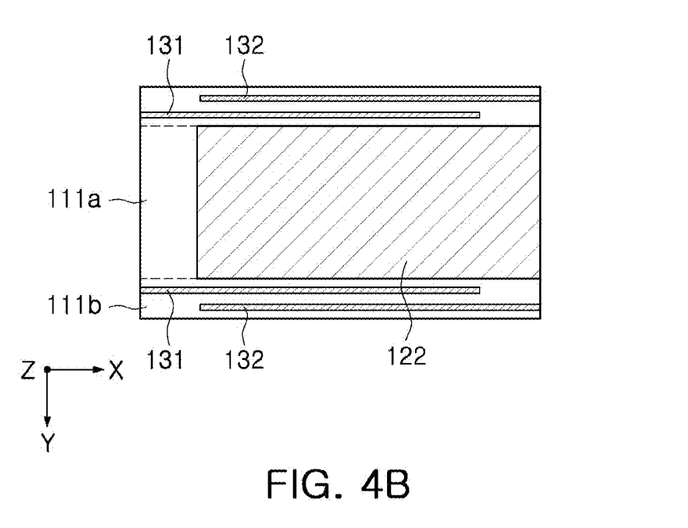
FIG. 4B is a view of a second internal electrode in the X and Y direction cross-sectional views of FIG. 1.
Figure 5A:
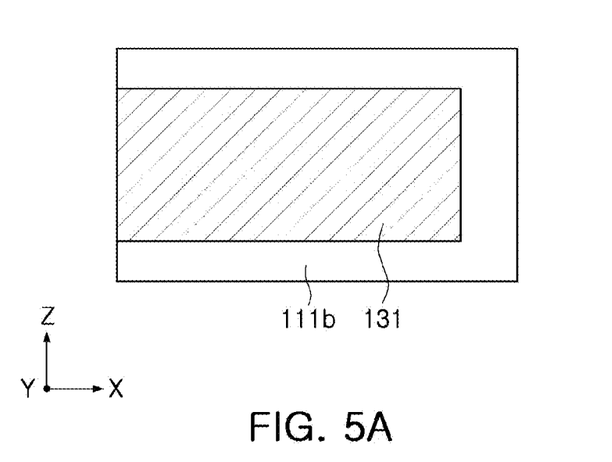
FIG. 5A illustrates a second dielectric layer on which a first margin electrode is printed.
Figure 5B:
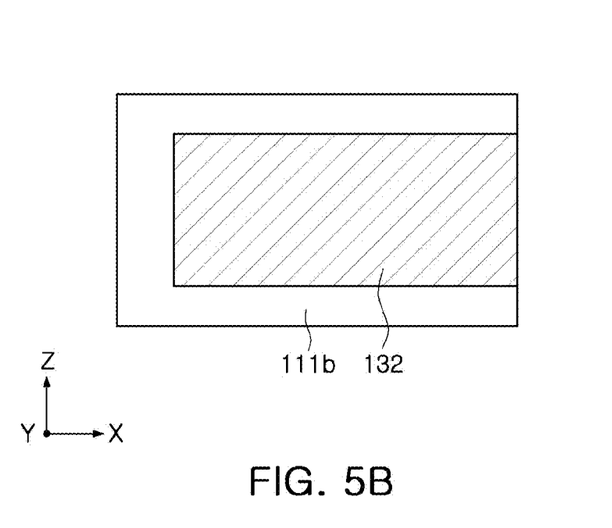
FIG. 5B illustrates a second dielectric layer on which a second margin electrode is printed.

FIG. 4A is a view of a first internal electrode in the X and Y direction cross-sectional views of FIG. 1; and FIG. 4B is a view of a second internal electrode in the X and Y direction cross-sectional views of FIG. 1;

FIG. 5A illustrates a second dielectric layer on which a first margin electrode is printed; and FIG. 5B illustrates a second dielectric layer on which a second margin electrode is printed.

Hereinafter, a capacitor component according to an embodiment of the present disclosure will be described in detail with reference to FIGS. 1 to 5.

A capacitor component 100 according to an embodiment of the present disclosure may include a body 110 including a first surface 1 and a second surface 2 opposing each other in a first direction (a Z direction), a third surface 3 and a fourth surface 4 connected to the first and second surfaces and opposing each other in a second direction (an X direction), a fifth surface 5 and a sixth surface 6 connected to the first to fourth surfaces and opposing each other in a third direction (a Y direction), and including a first dielectric layer 111a, and a first internal electrode 121 and a second internal electrode 122 disposed to oppose each other in the first direction with the first dielectric layer interposed therebetween; a first side margin portion 114 and a second side margin portion 115, respectively including a second dielectric layer 111b, a first margin electrode 131, and a second margin electrode 132, disposed in parallel with the fifth and sixth surfaces of the body, and respectively disposed on the fifth and sixth surfaces of the body; a first external electrode 141 disposed on the third surface of the body and connected to the first internal electrode 121 and the first margin electrode 131; and a second external electrode 142 disposed on the fourth surface of the body and connected to the second internal electrode 122 and the second margin electrode 132.

The body 110 may have the first dielectric layer 111a and the internal electrodes 121 and 122, alternately stacked.

The specific shape of the body 110 is not particularly limited. As illustrated, the body 110 may have a hexahedral shape or the like. Due to shrinkage of a ceramic powder contained in the body 110 during a sintering process, the body 110 may not have a hexahedral shape with completely straight lines, but may have substantially hexahedral shape.

The body 110 may have the first and second surfaces 1 and 2 opposing each other in the thickness direction (the Z direction), the third and fourth surfaces 3 and 4 connected to the first and second surfaces 1 and 2 and opposing each other in the longitudinal direction (the X direction), and the fifth and sixth surfaces 5 and 6 connected to the first and second surfaces 1 and 2, connected to the third and fourth surfaces 3 and 4, and opposing each other in the width direction (the Y direction).

The plurality of first dielectric layers 111a forming the body 110 may be in a sintered state, and it may be difficult to confirm boundaries between adjacent first dielectric layers 111a without using a scanning electron microscope (SEM).

According to an embodiment of the present disclosure, a raw material for forming the first dielectric layer 111a is not particularly limited, as long as sufficient capacitance may be obtained. For example, a barium titanate-based material, a lead composite perovskite-based material, a strontium titanate-based material, or the like, may be used for forming the first dielectric layer 111a.

Various ceramic additives, organic solvents, plasticizers, binders, dispersants, and the like may be added to the powder of barium titanate ($BaTiO_3$) according to the purpose of the present disclosure, as the material for forming the first dielectric layer 111a.

Lower and upper cover layers 113 and 112, having a predetermined thickness, may be formed on a lower surface of a lowermost internal electrode of the body 110 and on an upper portion of an uppermost internal electrode of the body 110, respectively. In this case, the lower and upper cover layers 113 and 112 may have the same composition as the first dielectric layer 111a, and dielectric layers not including an internal electrode may be formed by stacking at least one thereof on an upper portion of an uppermost internal electrode and on a lower surface of a lowermost internal electrode, respectively.

The first internal electrode 121 may be disposed on the first dielectric layer 111a to be exposed to the third surface 3, the fifth surface 5, and the sixth surface 6 of the body 110. In this case, the first internal electrodes 121 may be disposed to be spaced apart from the fourth surface 4 by a predetermined distance.

The second internal electrode 122 may be disposed on the first dielectric layer 111a to be exposed to the fourth surface 4, the fifth surface 5, and the sixth surface 6 of the body 110. In this case, the second internal electrode 122 may be disposed to be spaced apart from the third surface 3 by a predetermined distance.

The first and second internal electrodes 121 and 122 may be formed on and stacked on a ceramic sheet forming the first dielectric layer 111a, and may be then sintered to be disposed inside of the body 110 with the first dielectric layer 111a interposed therebetween in the thickness direction.

The first and second internal electrodes 121 and 122 may be electrodes having different polarities, may be arranged to oppose each other in a stacking direction of the first dielectric layers 111a, and may be electrically insulated from each other due to the first dielectric layer 111a being interposed therebetween.

A material for forming the first and second internal electrodes 121 and 122 is not particularly limited, and may be formed, for example, by using a conductive paste made of a noble metal material such as palladium (Pd), a palladium-silver (Pd—Ag) alloy, or the like, and one or more of nickel (Ni) and copper (Cu).

The conductive paste may be printed by a screen printing method or a gravure printing method, but the present disclosure is not limited thereto.

When the internal electrode is exposed to outside of the body, a short circuit may occur due to the introduction of conductive foreign substances or the like, thereby decreasing the reliability of the multilayer ceramic capacitor. Therefore, conventionally, when the internal electrode is formed on the dielectric layer, an area of the dielectric layer may be formed to be larger than an area of the internal electrode, and a margin region may be formed in remaining peripheral portion of the internal electrode, excluding a portion of the internal electrode connected to the external electrode. That is, the margin region refers to a region of a dielectric layer on which no internal electrode is formed. When the internal electrode is formed on the dielectric layer in a manufacturing process, the internal electrode may have a shape like that protruded from the margin region. Therefore, the protruded shape may form a step difference. When tens to hundreds of dielectric layers are stacked, the dielectric layers may be elongated to fill the step difference. When the dielectric layers are elongated, the internal electrodes may be also bent. When the internal electrode is bent, a breakdown voltage (BDV) may be reduced in a portion corresponding thereto.

Therefore, the multilayer ceramic capacitor according to an embodiment of the present disclosure may remove the margin region on the fifth and sixth surfaces 5 and 6 of the body 110, to prevent the step difference due to the internal electrode from occurring. Therefore, since it is possible to prevent the internal electrode from being bent in the width direction, to prevent decrease of withstand voltage characteristics, the reliability of the capacitor component may be improved.

The first internal electrode 121 may be led out to the third surface 3, and the second internal electrode 122 may be led out to the fourth surface 4. Since the first external electrode 141 is formed on the third surface 3, and the second external electrode 142 is formed on the fourth surface 4, the first internal electrode 121 and the second internal electrode 122 may be not exposed externally, and may be protected by the first external electrode 141 and the second external electrode 142.

Since the first and second internal electrodes 121 and 122 are exposed to the fifth and sixth surfaces 5 and 6, the first and second side margin portions 114 and 115 may be needed to be disposed for protecting the internal electrodes formed therein.

The first side margin portion 114 may be disposed on a sixth surface 6 of the body, the second side margin portion 115 may be disposed on a fifth surface 5 of the body, and the first and second side margin portions 114 and 115 may include the second dielectric layer 111b, and the first and second margin electrodes 131 and 132, arranged in parallel with the fifth and sixth surfaces of the body.

A measurement of each of the first and second side margin portions 114 and 115 in the second direction (the X direction) may be the same as a measurement of the body 110 in the second direction (the X direction).

A measurement of each of the first and second side margin portions 114 and 115 in the first direction (the Z direction) may be the same as a measurement of the body 110 in the first direction (the Z direction).

The first side margin portion 114 may be disposed to cover all of the sixth surface 6 of the body, and the second side margin portion 115 may be disposed to cover all of the fifth surface 5 of the body.

The plurality of second dielectric layers 111b may be stacked in the third direction (the Y direction).

A material for forming the second dielectric layer 111b is not particularly limited, and may be the same as the material for forming the first dielectric layer 111a. For the material included in the second dielectric layer 111b, various ceramic additives, organic solvents, plasticizers, binders, dispersants, and the like may be added to powders such as barium titanate ($BaTiO_3$) according to the purpose of the present disclosure.

The first and second margin electrodes 131 and 132 may disperse the current to reduce equivalent series inductance (ESL).

When alternating current may be propagated through the internal electrodes 121 and 122 connected to the external electrodes 141 and 142, respectively, and frequency increases, skin effect and proximity effect cause current to be concentrated on a lower portion and an edge portion of a chip.

The concentrated current at the lower portion and the edge portion of the chip may be the main source of the ESL formation. Therefore, the ESL may be lowered when this current is distributed.

Since the first and second margin electrodes 131 and 132 are connected to the first and second external electrodes 141 and 142, respectively, and the first and second external electrodes 141 and 142 may be disposed on one of the edge portions of the first and second internal electrodes 121 and 122 as illustrated in FIGS. 3, 4A, and 4B, it is possible to effectively disperse the current concentrated on the edge portion.

One end of the first margin electrode 131 may be exposed to the first external electrode 141 in the second direction (the Y direction), and one end of the second margin electrode 132 may be exposed to the second external electrode 142 in the second direction (the Y direction), to be connected to the first and second external electrodes 141 and 142, respectively.

A material for forming the first and second margin electrodes 131 and 132 is not particularly limited, and may be formed, for example, by using a conductive paste made of a noble metal material such as palladium (Pd), a palladium-silver (Pd—Ag) alloy, or the like, and one or more of nickel (Ni) and copper (Cu). Further, the material for forming the first and second margin electrodes 131 and 132 may include the same material as the first and second internal electrodes 121 and 122.

The conductive paste may be printed by a screen printing method or a gravure printing method, but the present disclosure is not limited thereto.

Referring to FIG. 3, the first and second margin electrodes 131 and 132 may be disposed to oppose each other in the third direction (the Y direction) with the second dielectric layer 111b interposed therebetween.

Figure 6:
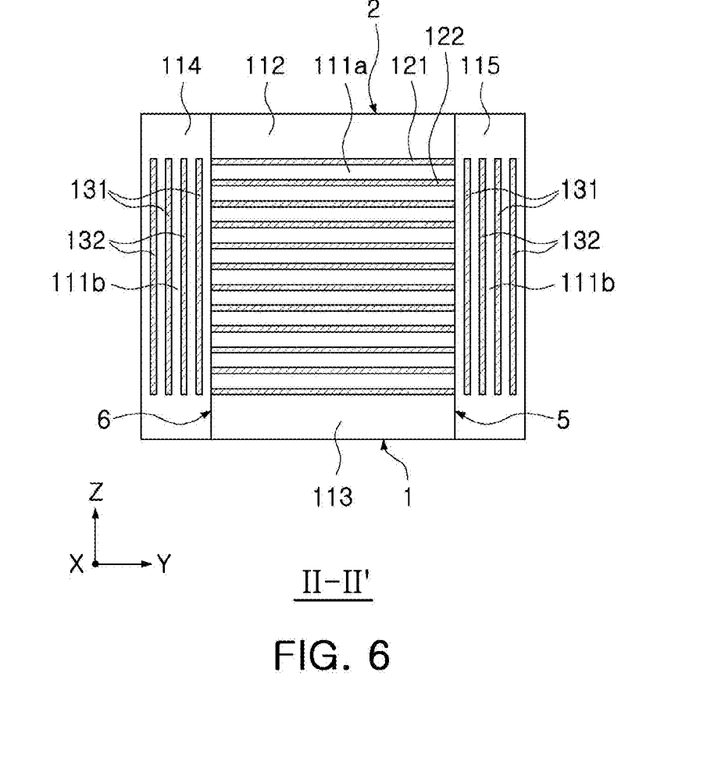
FIG. 6 is a cross-sectional view taken along line II-II' in FIG. 1 for an embodiment in which the first and second side margin portions each include two first and second margin electrodes, respectively.

Referring to FIG. 6, the first and second side margin portions 114 and 115 may include a plurality of first and second margin electrodes 131 and 132, respectively, and the plurality of first and second margin electrodes 131 and 132 may be alternately arranged in the third direction (the Y direction).

Therefore, it is possible to secure additional capacitance by the first and second margin electrodes 131 and 132, and the current dispersion effect may be improved as the number of stacked layers of the first and second margin electrodes 131 and 132 increases.

The first and second side margin portions 114 and 115 may be formed, by stacking the second dielectric layer 111b in which the first margin 131 of FIG. 5A is printed, and the second dielectric layer 111b in which the second dielectric layer 132 of FIG. 5B is printed, on the fifth and sixth surfaces of the body in the third direction (the Y direction).

Figure 7:
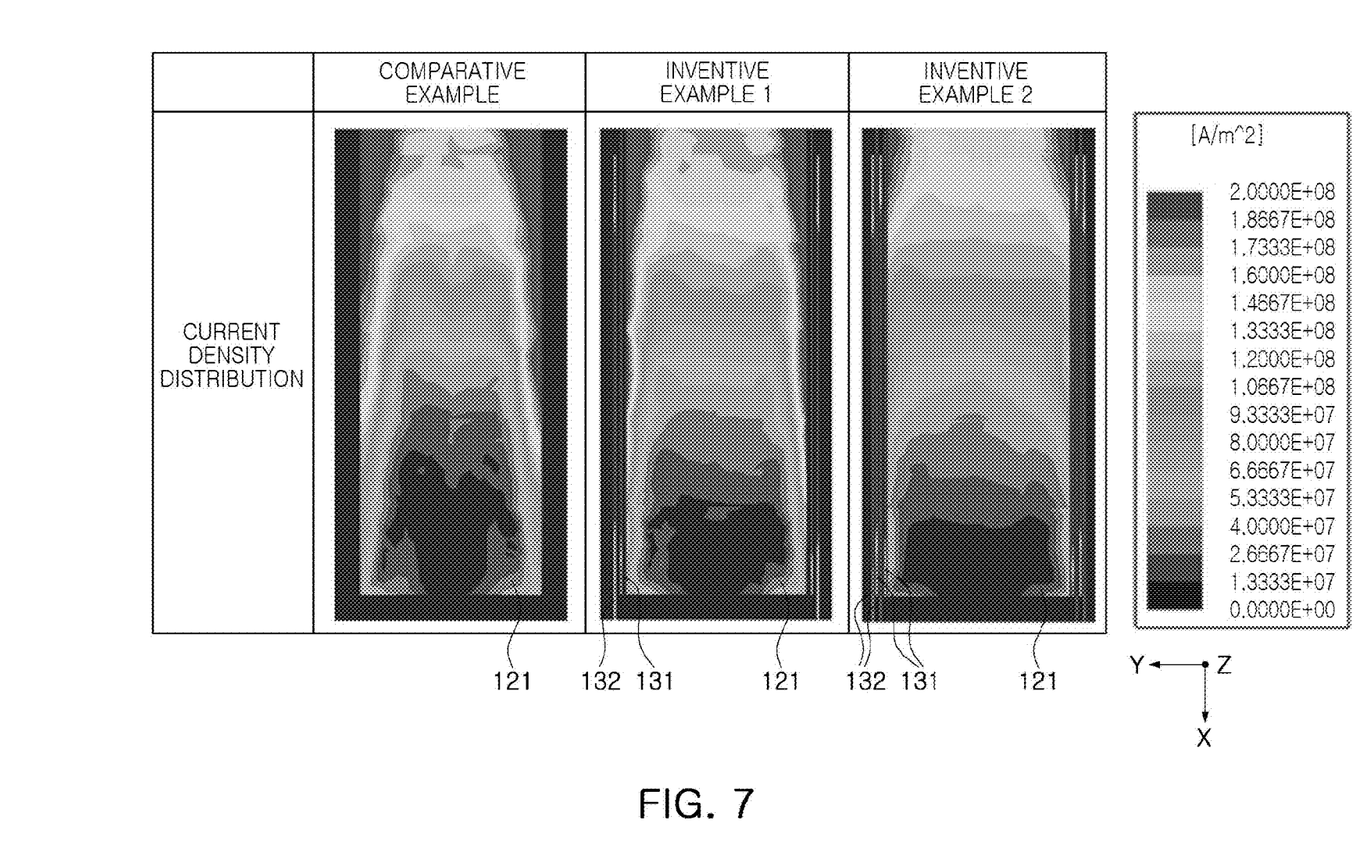
FIG. 7 illustrates current density distributions observed in the X and Y direction cross-sectional views with respect to a case in which there are no first and second margin electrodes (Comparative Example), a case in which first and second side margin portions each include one pair of first and second margin electrodes (Inventive Example 1), and a case in which two side margin portions each include two pairs of first and second margin electrodes (Inventive Example 2).

FIG. 7 illustrates current density distributions observed in the X and Y direction cross-sectional views with respect to a case in which there are no first and second margin electrodes (Comparative Example), a case in which first and second side margin portions each include one pair of first and second margin electrodes (Inventive Example 1), and a case in which two side margin portions each include two pairs of first and second margin electrodes (Inventive Example 2).

Figure 8:
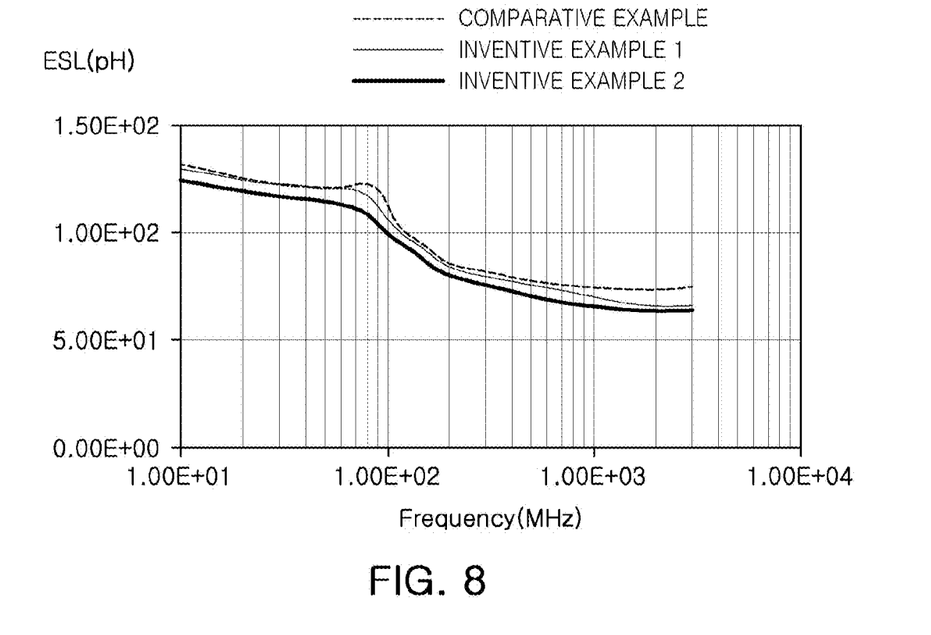
FIG. 8 is a graph illustrating measured ESL of Comparative Example, Inventive Example 1, and Inventive Example 2 in FIG. 7.

FIG. 8 is a graph illustrating measured ESL of Comparative Example, Inventive Example 1, and Inventive Example 2 in FIG. 7.

Comparative Example was a case in which first and second margin electrodes were not provided in side margin portions 114 and 115, Inventive Example 1 was the same as that of FIG. 3, and Inventive Example 2 was the same as that of FIG. 6.

Table 1 below illustrates ESL average values at the frequency of 50 MHz to 3 GHz, and percentages, relative to Comparative Example, of Comparative Example, Inventive Example 1, and Inventive Example 2.

TABLE 1

| | Comparative Example | Inventive Example 1 | Inventive Example 2 |
|---|---|---|---|
| ESL(pH) | 87.39 | 83.83 | 79.26 |
| Percentage | 100% | 95.93% | 90.71% |

Referring to Table 1 and FIG. 7, it can be seen that current densities in edge portions of internal electrodes were lowered by arranging the margin electrodes 131 and 132 in the side margin portions 114 and 115, and ESLs thereof were reduced.

In the case of Inventive Example 1 in which the first and second side margin portions 114 and 115 each included a pair of the first and second margin electrodes 131 and 132, the ESL of about 4% was reduced, compared to the Comparative Example; and in the case of Inventive Example 2 in which the first and second side margin portions 114 and 115 each include two pairs of first and second margin electrodes 131 and 132, the ESL of about 10% was reduced, compared to the Comparative Example.

Therefore, it can be seen that the current dispersion effect may be improved, as the number of stacked layers of the first and second margin electrodes 131 and 132 increases.

Referring to FIG. 8, it can be seen that the ESL reduction effect tends to increase, as the frequency increases.

A first external electrode 141 may be disposed on a third surface 3 of a body, to be connected to a first internal electrode 121 and a first margin electrode 131. A second external electrode 142 may be disposed on a fourth surface 4 of a body, to be connected to a second internal electrode 122 and a second margin electrode 132.

The second external electrode 142 may be connected to a potential different from that of the first external electrode 141.

The first and second external electrodes 141 and 142 may be formed of any material having electrical conductivity such as a metal or the like, and specific materials thereamong may be determined in consideration of electrical characteristics, structural stability, and the like, and may have a multilayer structure.

For example, the first and second external electrodes 141 and 142 may include first and second electrode layers 141a and 142a, respectively, disposed on the body 110, and first and second plated layers 141b and 142b formed on the electrode layers 141a and 142a, respectively.

More specifically with respect to the first and second electrode layers 141a and 142a, for example, the first and second electrode layers 141a and 142a may be sintered electrodes including a conductive metal and glass, and the conductive metal may be copper (Cu). The first and second electrode layers 141a and 142a may be resin-based electrodes containing a plurality of metal particles and a conductive resin, or may include both a sintered electrode and a resin-based electrode.

More specifically with respect to the first and second plated layers 141b and 142b, for example, the first and second plated layers 141b and 142b may be nickel (Ni) plated layers or tin (Sn) plated layers. A Ni plated layer and a Sn plated layer may be sequentially formed on the first and second electrode layers 141a and 142a, and may include a plurality of Ni plated layers and/or a plurality of Sn plated layers.

Hereinafter, first and second margin electrodes according to modified embodiments of the present disclosure are described with reference to FIGS. 9 to 13.

FIGS. 9 to 13 are views illustrating second dielectric layers 111*b* on which first and second margin electrodes 231, 232, 331, 332, 431, 432, 531, 532, 631, and 632 according to modified embodiments of the present disclosure are printed.

Figure 9:
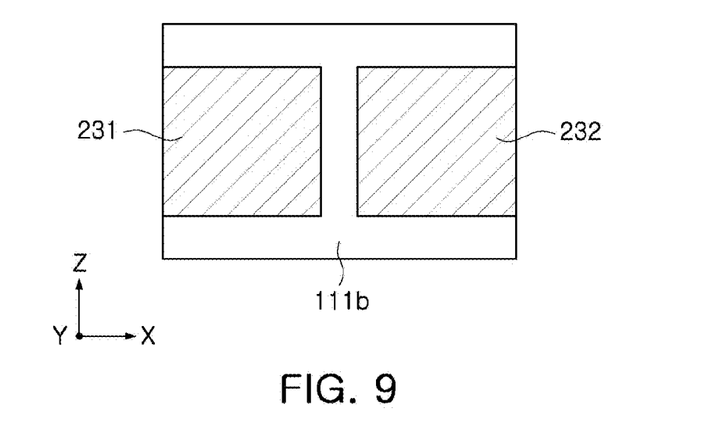
FIG. 9 is a view illustrating a second dielectric layer 111b on which first and second margin electrodes 231 and 232 according to modified embodiments of the present disclosure are printed and disposed on the same plane.

Referring to FIG. 9, in an embodiment, first and second margin electrodes 231 and 232 may be disposed on the same plane. In this case, the same plane may refer to a Z and X directional cross-section, and may be a plane parallel to fifth and sixth surfaces of a body.

Therefore, a thickness of first and second side margin portions 114 and 115 may be reduced while achieving the current dispersion effect, thereby maximizing the capacitance per unit volume of the capacitor component.

Further, as described above, when the frequency rises, the current may be concentrated on the lower portion of the chip by the skin effect and the proximity effect.

Figure 10A:
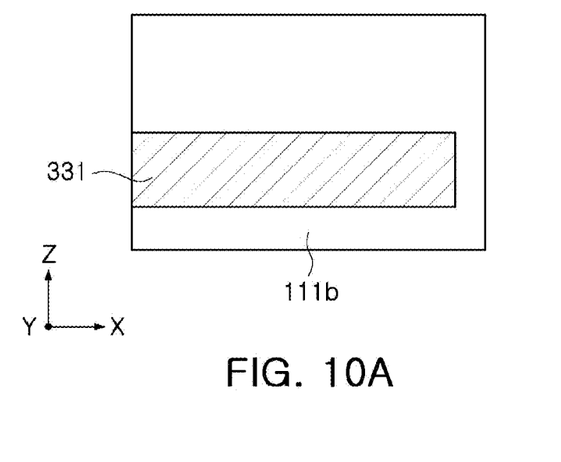
FIG. 10A is a view illustrating s second dielectric layer 111b on which a first margin electrode 331 is formed in the lower portion in the first direction (the Z direction) according to modified embodiments of the present disclosure.
Figure 10B:
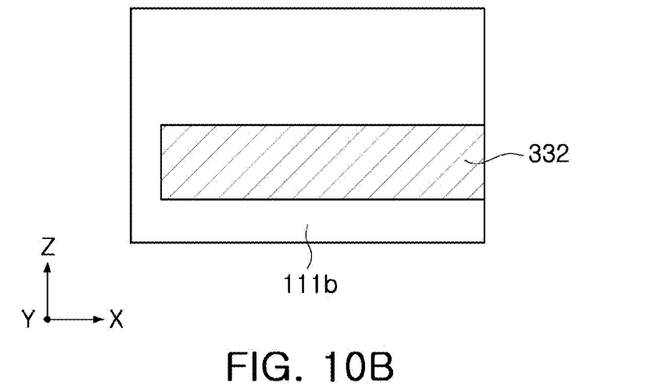
FIG. 10B is a view illustrating a second dielectric layer 111b on which second margin electrode 332 is formed in the lower portion in the first direction (the Z direction) according to modified embodiments of the present disclosure.
Figure 11A:
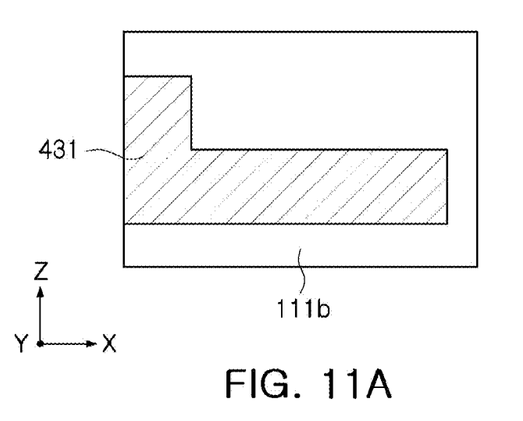
FIG. 11A is a view illustrating s second dielectric layer 111b on which a first margin electrode 431 is formed to have a larger area in the lower portion than that of the upper portion in the first direction (the Z direction) according to modified embodiments of the present disclosure.
Figure 11B:
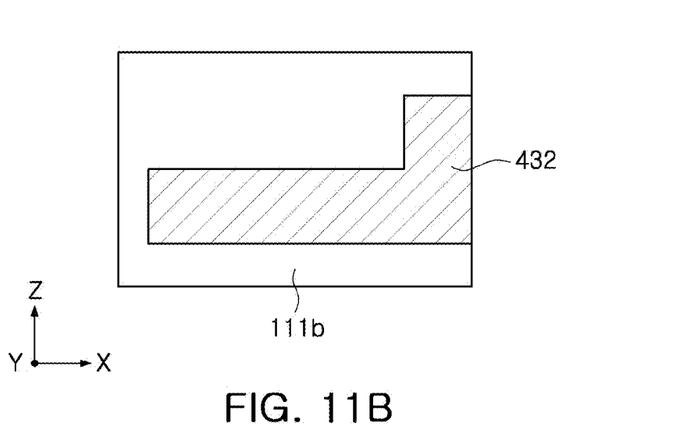
FIG. 11B is a view illustrating a second dielectric layer 111b on which a second margin electrode 432 is formed to have a larger area in the lower portion than that of the upper portion in the first direction (the Z direction) according to modified embodiments of the present disclosure.
Figure 12A:
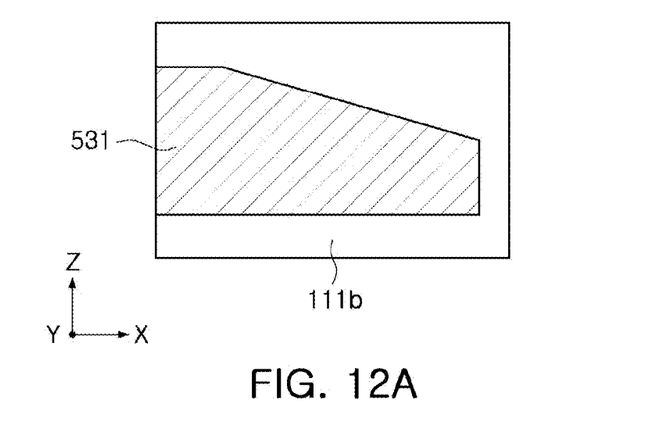
FIG. 12A is a view illustrating s second dielectric layer 111b on which a first margin electrode 531 is formed to have a larger area in the lower portion than that of the upper portion in the first direction (the Z direction) according to modified embodiments of the present disclosure.
Figure 12B:
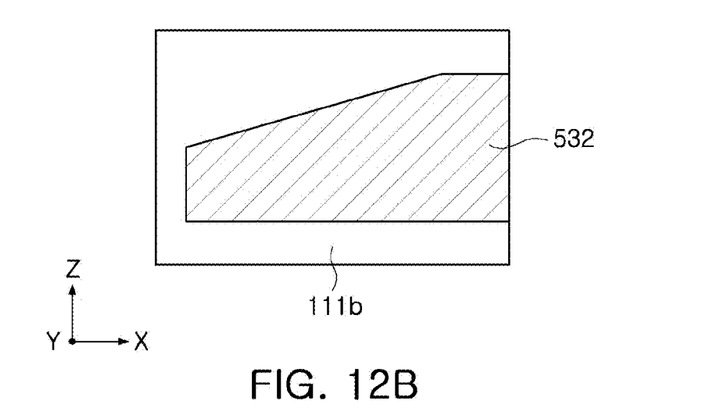
FIG. 12B is a view illustrating a second dielectric layer 111b on which second margin electrode 532 is formed to have a larger area in the lower portion than that of the upper portion in the first direction (the Z direction) according to modified embodiments of the present disclosure.
Figure 13A:
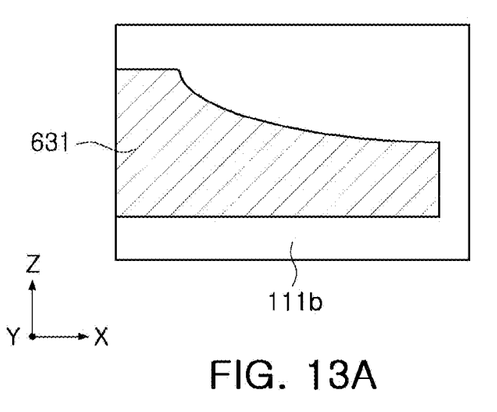
FIG. 13A a view illustrating s second dielectric layer 111b on which a first margin electrode 631 is formed to have a larger area in the lower portion than that of the upper portion in the first direction (the Z direction) according to modified embodiments of the present disclosure.
Figure 13B:
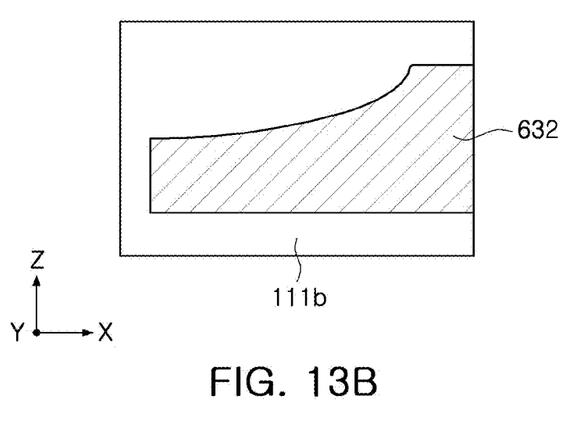
FIG. 13B is a view illustrating a second dielectric layer 111b on which second margin electrode 632 is formed to have a larger area in the lower portion than that of the upper portion in the first direction (the Z direction) according to modified embodiments of the present disclosure.

Therefore, it is possible to efficiently distribute the current, by only forming the first and second margin electrodes 331 and 332 in the lower portion in the first direction (the Z direction), as illustrated in FIGS. 10A and 10B, and forming the first and second margin electrodes 431, 432, 531, 532, 631, and 632 to have a larger area in the lower portions thereof than that of the upper portions thereof in the first direction (the Z direction), as illustrated in FIGS. 11A, 11B, 12A, 12B, 13A, and 13B.

The lower portion in the first direction (the Z direction) may refer to the lower portion of the capacitor component 100, and may mean a portion close to surfaces to be mounted.

As one of the effects of the present disclosure, it is possible to reduce the equivalent series inductance (ESL) by dispersing the current by arranging the margin electrode in the side margin portion.

It should be understood, however, that the various and advantageous advantages and effects of the present disclosure is not limited to those described above, and may be more readily understood in the course of describing a specific embodiment of the present disclosure.

While example embodiments have been illustrated and described above, it will be apparent to those skilled in the art that modifications and variations could be made without departing from the scope of the present disclosure as defined by the appended claims.

What is claimed is:

1. A capacitor component comprising:
a body including a first surface and a second surface opposing each other in a first direction, a third surface and a fourth surface connected to the first and second surfaces and opposing each other in a second direction, a fifth surface and a sixth surface connected to the first to fourth surfaces and opposing each other in a third direction, and including a first dielectric layer, and a first internal electrode and a second internal electrode disposed to oppose each other in the first direction with the first dielectric layer interposed therebetween;
a first side margin portion and a second side margin portion, respectively including a second dielectric layer, a first margin electrode, and a second margin electrode, disposed in parallel with the fifth and sixth surfaces of the body, and respectively disposed on the fifth and sixth surfaces of the body;
a first external electrode disposed on the third surface of the body and connected to the first internal electrode and the first margin electrode; and
a second external electrode disposed on the fourth surface of the body and connected to the second internal electrode and the second margin electrode,
wherein the first internal electrode and the second internal electrode are connected to the first margin portion and the second margin portion,
the first and second margin electrodes are spaced apart from the first and second internal electrodes,
the first and second margin electrodes are disposed to oppose each other in the third direction with the second dielectric layer interposed therebetween, and
the first and second side margin portions each comprise a plurality of first and second margin electrodes.

2. The capacitor component according to claim 1, wherein the plurality of first and second margin electrodes are alternately arranged in the third direction.

3. The capacitor component according to claim 1, wherein the plurality of first and second margin electrodes are formed only in a lower portion of each of the first and second side margin portions in the first direction.

4. The capacitor component according to claim 1, wherein a lower area of each of the plurality of first and second margin electrodes is larger than an upper area thereof in the first direction.

5. The capacitor component according to claim 1, wherein the first internal electrode is exposed to the third, fifth, and sixth surfaces of the body, and the second internal electrode is exposed to the fourth to sixth surfaces of the body.

6. The capacitor component according to claim 1, wherein the plurality of first margin electrodes are exposed to one end in the second direction, and the plurality of second margin electrodes are exposed to the other end in the second direction.

7. The capacitor component according to claim 1, wherein a measurement of the first and second side margin portions in the second direction is equal to a measurement of the body in the second direction.

8. The capacitor component according to claim 1, wherein a measurement of the first and second side margin portions in the first direction is equal to a measurement of the body in the first direction.

9. The capacitor component according to claim 1, wherein the first side margin portion is disposed to cover the entire sixth surface of the body, and the second side margin portion is disposed to cover the entire fifth surface of the body.

10. The capacitor component according to claim 1, wherein the first and second external electrodes include an electrode layer and a plated layer formed on the electrode layer, respectively.

11. The capacitor component according to claim 10, wherein the electrode layer comprises a sintered electrode including a conductive metal and glass.

12. The capacitor component according to claim 10, wherein the plated layer comprises nickel (Ni) plated layer or tin (Sn) plated layer.

13. The capacitor component according to claim 1, wherein the second dielectric layer includes a material that is the same as a material included in the first dielectric layer.

14. The capacitor component according to claim 1, wherein the first and second dielectric layers respectively include barium titanate ($BaTiO_3$) and one or more additives selected from the group consisting of ceramic additives, organic solvents, plasticizers, binders and dispersants.

15. The capacitor component according to claim 1, wherein the plurality of first and second margin electrodes include the same material as the first and second internal electrodes.

16. The capacitor component according to claim 1, wherein the plurality of first and second margin electrodes include a conductive paste of a noble metal material selected from the group consisting of palladium (Pd), a palladium-silver (Pd—Ag) alloy, nickel (Ni) and copper (Cu).

17. The capacitor component according to claim 1, wherein the first side margin portion and the second side margin portion disposed only on an outer surfaces of the body.

\* \* \* \* \*